May 28, 1968     W. E. BRIGGS     3,385,102

RAPID CYCLE LEAK DETECTION OF PLURAL TEST PIECES

Filed April 21, 1966

United States Patent Office 3,385,102
Patented May 28, 1968

3,385,102
RAPID CYCLE LEAK DETECTION OF
PLURAL TEST PIECES
Walton E. Briggs, Lynnfield, Mass., assignor to National
Research Corporation, Cambridge, Mass., a corporation of Massachusetts
Filed Apr. 21, 1966, Ser. No. 544,312
9 Claims. (Cl. 73—40.7)

ABSTRACT OF THE DISCLOSURE

Leak detection apparatus capable of providing 100% testing of small units at rates on the order of 1200 per hour. The apparatus comprises (1) fine vacuum gas analysis instrument such as a mass spectrometer with (1a) an accessory fine vacuum pumping means for producing the so called "high vacuum" levels needed for operation of a mass spectrometer, (2) an inlet port for a test unit, and (3) roughing pump means all interconnected via (4) a tunnel valve body and (5) a spool form valving member.

---

The present invention relates to the art of measurements and particularly to techniques for leak detection of a plurality of test pieces. Leak detection, per se, is a well developed art dating from the beginnings of the vacuum art itself. In the early 1940's mass spectrometers tuned to inert trace gas were first used for leak detection and a wide variety of such instruments are marketed now. Halogen sensitive meters and even ordinary total pressure gauges are used as leak detection instruments. The common denominator of all such instruments, insofar as the invention is concerned, is that the instrument has a fine vacuum system for evacuating the instrument in preparation for an intake of trace gas from the piece under test and a rough vacuum sytem for preparing the piece under test for connection to the fine vacuum system.

In production operations it is often necessary to test a large number of pieces for leakage. Applying the leak detection instrument to one piece after another has been found too slow. The art has resorted to other techniques such as package leak testing—many pieces, with trace gas sealed in, are placed in a package which is connected to the leak detection instrument for testing all the pieces together. Another technique is to provide a manifold with many inlets and a valve for each inlet. The manifold is connected to the leak detector. A test piece is connected to each inlet (or alternatively, a small chamber containing a test piece with trace gas sealed in) is connected to each inlet. Then the operator tries many permutations of valve opening (or opens one valve at a time with the others closed) to determine whether any of the pieces should be rejected for leakage.

OBJECTS

The principal object of the invention is to provide leak detector operators with a capability for rapid cycle leak detection operation free of the complexity and awkwardness of prior art arrangements.

A further object of the invention is to provide leak detector operators with a capability of higher production rates than feasible with prior art arrangements.

A further object of the invention is to provide apparatus for rapid cycle leak testing which is just as rapid whether the reject rate is high or low.

The invention accordingly comprises an improved leak detector combination and the subcombination of the leak detector accessory inlet valve affording the above advantages, a preferred embodiment of which is described in the following detailed specification, and the full scope of application of which is indicated in the claims.

Other objects, features and advantages of the invention will, in part, be obvious and will, in part, appear hereinafter.

The preferred embodiment of the invention is described with reference to the accompanying drawings wherein.

Figure 1A:
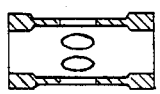
FIG. 1A is a sectional view of a sleeve item from FIG. 1.
Figure 1:
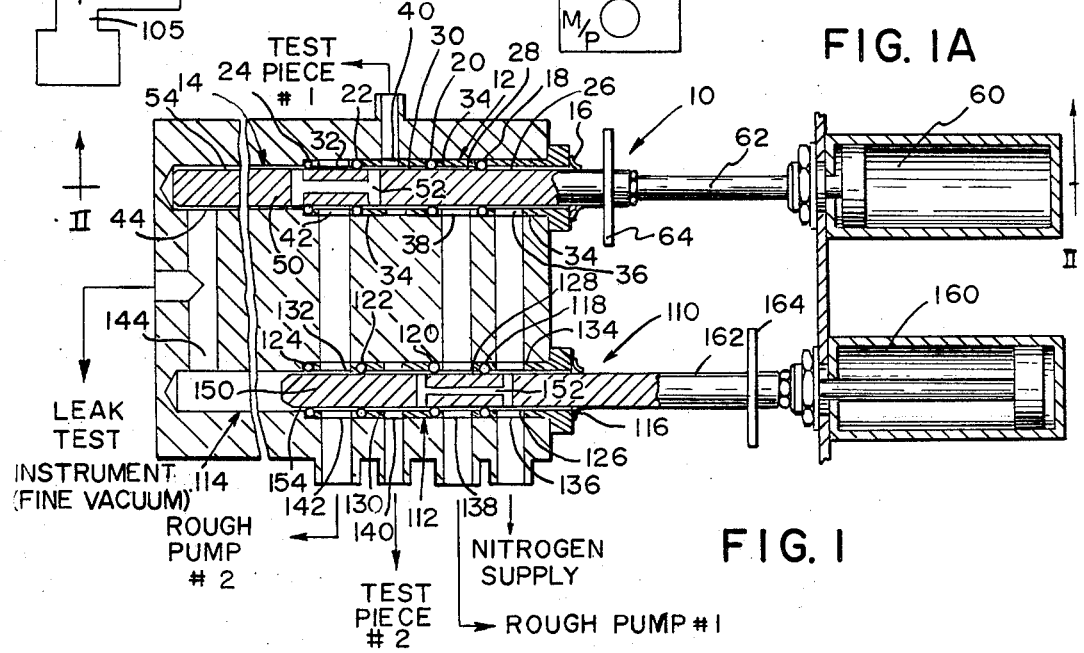
FIG. 1 is a sectional top view of the improved accessory inlet valve of the invention.

Referring to FIG. 1, an inlet valve assembly, comprising two valves, 10 and 110, is shown.

The valve 10 comprises a first valve tunnel 12 and a second valve tunnel 14, the second valve tunnel being an extension of the first valve tunnel and narrower than the first valve tunnel. A series of rubbery gaskets 16, 18, 20, 22, 24 are mounted along the length of the tunnel 12 and manifold spaces are formed between the gaskets. An air release manifold 26 is formed between gaskets 16 and 18. A first roughing manifold 28 is formed between gaskets 18 and 20. A test port manifold is formed between gaskets 20 and 22. A second roughing manifold 32 is formed between gaskets 22 and 24. Finally, the tunnel 14 itself forms a high vacuum manifold. The gaskets 16, 18, 20, 22, 24 are held against axial movement by a series of cylindrical spacers 34. A typical spacer 34 is shown in greater detail in FIG. 1A.

Returning to FIG. 1, there is a series of ports communicating with the above-described manifolds of FIG. 1. An air release port 36 provides communication between the air release manifold 26 and a purge gas (such as nitrogen or air) supply. A first roughing port 38 provides communication between the first roughing manifold 28 and a rough pump #1. A test port 40 provides communication between the test port manifold 30 and a test piece #1. A second roughing port 42 provides communication between the second roughing manifold 32 and a rough pump #2. A high vacuum port 44 provides communication betwen the tunnel 14 and the high vacuum zone of the leak test instrument.

A valve spool 50 is slidable in the tunnel portions 12 and 14. The spool contains an internal passage 52. As the spool 50 slides within the tunnel portions, the passage 52 places the various ports in communication with each other as outlined below under OPERATION. The spool 50 typically comprises a stainless steel rod of ½ inch diameter with a surface coating of Teflon about .001 inch thick to provide a self lubricating feature which allows the spool to slide easily past contacting gaskets 16, 18, 20, 22, 24, while forming a good vacuum seal with each of those O-rings. The spool is sized to provide a restricted passage 54 between the spool and tunnel 14, having a clearance of between .001 and .005 inch. This restricted passage is maintained throughout operation of the spool to protect the high vacuum zone and the leak test instrument from an accidental air release. The restricted passage 54 has its greatest length (typically one inch) when the spool 50 is in the position shown for valve 10 in FIG. 1. In the said position, test piece #1 is in communication with the high vacuum zone via the test port 40, manifold 30, passage 52, passage 54 and high vacuum port 44.

The valve spool 50 is actuated by servomotor 60 through an actuator rod 62. A flange 64 extends outwardly from the valve spool for tripping a lever arm as described below.

Figure 2:
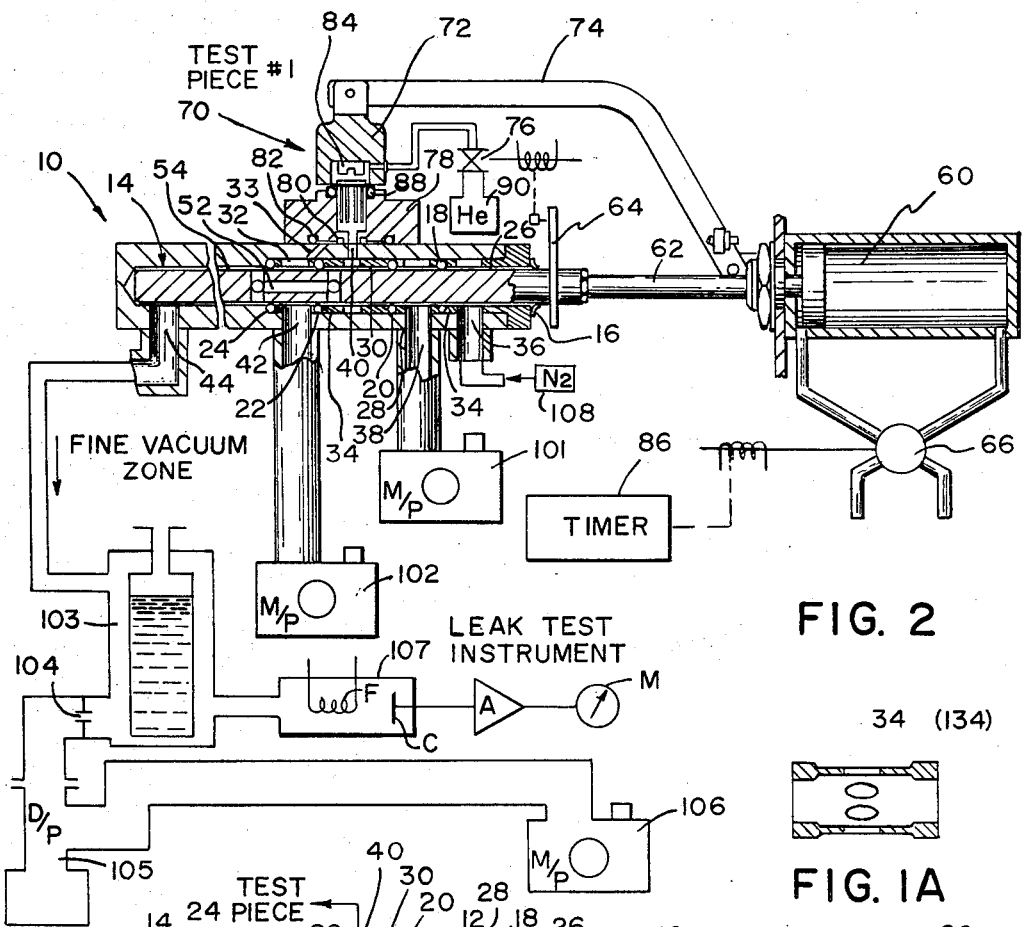
FIG. 2 is a side sectional view of the valve cut as indicated by the lines II—II in FIG. 1 and also indicating the improved leak detector and vacuum system of the present invention.

Referring now to FIG. 2, there is shown a cross-section of the valve 10, taken along the line II—II of FIG. 1. FIG. 2 also shows the leak detection system of the present invention.

In studying FIG. 2, it should first be noted that the test port 40 communicates with test piece #1 (e.g., a transistor or microcircuit chip with leads), the latter being held in a test fixture 70. The test fixture 70 comprises an upper jaw 72, mounted on a pivotal lever arm 74, and a lower jaw 78 mounted on the body of valve 10 over port 40. The vacuum-tight connection between fixture 70 and the valve 10 is assured by a pair of concentric O-rings 80, 82 between the valve and the lower jaw 78 of the fixture. The space between O-rings 80, 82 is evacuated continuously via a passage 33 connecting the space to the second roughing manifold 32.

A magnet 84 is mounted in upper jaw 72 for holding the test piece in place when the jaw 72 is raised at the end of a test cycle. Adequate vacuum tightness across the test piece, when the jaws 72, 78 are closed, is assured by an O-ring gasket 88 between the jaws.

A trace gas (e.g., helium) is admitted to the fixture via a valve 76 from a supply 90. If there are leaks in the test piece, the trace gas will pass through those leaks and into the first test port 40 and (when the valve is in the FIG. 2 position) on to the leak test instrument.

A timer 86 controls operation of the servomotor 60 via pilot valve 66.

The leak detector system, incorporating the improved valve 100, comprises a first roughing pump 101, a second roughing pump 102, and the fine vacuum pumping system, the parts of which are a cold trap 103, a throttle 104, a diffusion pump 105 and a backing pump 106. Included in the fine vacuum system is a leak test instrument 107 such as a mass spectrometer having a filament F, a collector C, an amplifier A and a leak rate meter M. Air release of the test piece region is provided from the nitrogen supply 108 via port 36 under control of valve spool 50 with its internal passage 52.

Referring again to FIG. 1, it will now be understood that the second valve 110 is similar to valve 10. Valve 110 comprises aligned tunnels 112, 114. An axial series of O-rings 116, 118, 120, 122, 124 is provided in tunnel 112. The O-rings are spaced from each other by spacers 134 (see FIG. 1A) to form manifolds 126, 128, 130, 132, 134 (FIG. 1). Ports 136, 138, 140, 142, 144 are provided in valve 110. The valving member is a spool 150 with an internal passage 152, operated by a servomotor 160 via rod 162. The spool has a flange 164 similar to the flange 64 of valve 10.

The valve 110 shares the vacuum system of valve 10. That is, the two valves utilize the same first mechanical roughing pump 101 (FIG. 2), the same second mechanical pump 102, the same fine vacuum zone 103–107 and air release supply 108. Each valve has its own test piece connection, port 40 in valve 10 and port 140 in valve 110. The test fixture for valve 10 is shown in FIG. 2; the test fixture for valve 110 is not shown. The servomotors 60, 160 operate the valve spools 50, 150 in staggered fashion as shown in FIG. 1.

SENSITIVITY IMPROVEMENT

While most of the advantages of the present invention are apparent from the foregoing description of structure, one particular advantage requires further mention and that is the improvement in sensitivity of the leak test process afforded by the present invention. In any leak test, a significant factor of background noise is atmospheric helium reaching the leak test instrument through valve system leaks. This atmospheric helium "noise" is, of course, indistinguishable from trace gas helium "signal" coming through leaks in the test piece and since the amount of atmospheric helium is unpredictable, it cannot be bucked out on a practical and economic basis. The structure described above substantially limits such inleakage of atmospheric helium, consistent with economy of construction and rapid cycle operation.

Atmospheric leakage through gasket 16, the major point of vulnerability, is first diluted by the relatively pure nitrogen supply continuously flowing to manifold zone 26, partially blocked by gasket 18 which rubs against plunger 50, partially pumped away by rough pump #1 via port 38, and further blocked by gasket 20.

Atmospheric helium (including residual trace helium from a previous cycle) which is trapped between cycles in the plunger's internal passage, in the manifold zones 26 and 30, in the test fixture 70, or under any of the gaskets, is subject to a similar screening in the next cycle, by removal through rough pump #1 and rough pump #2 as the leftward movement of the plunger 50 places the inlet port 40 in communication with ports 38 and 42, respectively via passage 52.

OPERATION

Consider the operation of valve 10 (which may be operated alone or in staggered sequence with valve 110 and, if desired, additional similar valves). The upper jaw 72 (FIG. 2) is initially raised with flange 64 holding up lever arm 74. The valve spool 50 is retracted to a position similar to that of spool 150 in FIG. 1. The port 36 (FIG. 2) is thus connected to the port 40 via manifold 26, passage 52 and manifold 30. A continuous flow of nitrogen purge gas runs through this communication and vents through the lower jaw 78 of the test fixture 70.

This motion causes flange 64 to clear lever arm 74 which drops jaw 72 into place to seal test piece #1 on O-ring 88. Further movement cuts off manifold 126 from communication with the test port, thus stopping the nitrogen supply. Now test port 40 is placed in communication with the first roughing pump 101 via manifold 30, passage 52, manifold 28 and port 38. This provide a rough evacuation of the region in the fixture 70 under test piece #1. Further movement places test port 40 in communication with the second roughing pump 102, via manifold 30, passage 52, manifold 32 and port 42. This continues the rough evacuation of the test piece area. Further movement of valve spool 50 to the left places test port 40 in communication with the fine vacuum zone via manifold 30, passage 52, restriction 54 and port 44. At this time, the flange 64 operates valve 76 (via a microswitch and solenoid) to admit helium trace gas to the test fixture 70. Leaks, if any, in the test piece transmit the trace gas to the port 40 and then to the fine vacuum zone via the above path. The rate of trace gas leakage is indicated by instrument 107.

After the necessary length of time for a leak test, timer 86 of valve 10 is activated to operate pilot valve 66 (or alternatively, timer 86 then removes a lock which allows the operator to operate pilot valve 66), to reverse the operation of valve spool 50, moving it to the right until it reaches its initial air-release position (nitrogen admitted to the test fixture via passage 52). At the end of the movement of valve spool 50 to the right flange 64 lifts arm 74 and upper jaw 72. The magnet 84 lifts the test piece with jaw 72. The operator removes test piece #1 from jaw 72 and inserts a new test piece #1 over O-ring 88 in preparation for the next cycle of valve 10.

The operations of valves 10 and 110 are staggered so that one or the other utilizes any of pumps 101, 102 or the fine vacuum zone 103–107, alternately. The timer 86 is constructed to allow operation of valve 110 after the forward-and-back operation of valve 10 is complete, and vice-versa. Thus, the system is made foolproof preventing double loading of any of the pumping system and allowing orderly sequence of test cycles with adequate test time in each cycle. During cycling of valve 10 the operator is loading a test piece #2 on valve 110 (i.e., port 140); during cycling of valve 110 the operator is loading a test piece #1 on valve 10 (i.e., port 40).

While a preferred embodiment of the invention has been described above, it should be understood that many other species, variations, and improvements can be based on the present inventive concept. For instance, the valve spools 50, 150 can be operated by hand. As another instance the test inlet port 40 and fixture 70 could be mounted on spool 50 (on the right end of spool 50) with passage 52 leading to test port 40; this is not as efficient as mounting the fixture on the valve body, but perfectly feasible (I have made prototypes of this kind) and within the scope of the present invention. As another instance of alternatives the number of valves can be varied from one to five (an upper practical limit for manual loading and unloading). As another instance, a gross leak port, connected to a gross leak tester, can be inserted in the apparatus; the passage 52 would connect port 40 to the gross leak test port before connecting port 40 to the fine leak test port 44. In case of a gross leak, an alarm could be tripped to prevent exposure of the gross leak input to the fine vacuum zone. However, it should be noted that the preferred embodiment of FIGS. 1–2 already has some protection against gross leaks in the form of the restricted passage 54 which throttles such leaks down to the lower gas handling capacity of the fine vacuum system. As another instance of alternatives, the single test piece can be replaced by a package of several test pieces (e.g., ten) where experience shows that the reject rate is very low, on the order of 1–5%; however, one-at-a-time testing is preferred, as described above. A variation of construction of the spool members 50, 150 would be to make these members by powder metallurgy techniques, impregnating the surface thereof with a dry, vacuum-compatible lubricant.

Other alternatives can be made. It is therefore intended that the above description and accompanying drawings shall be read as illustrative and not in a limiting sense.

I claim:

1. An improved vacuum apparatus for rapid cycle, sequential, mass spectrometer leak testing operations and like operations conducted at high speed and fine vacuum levels such as those sufficient to be compatible with mass spectrometer operation, the apparatus comprising, in combination:
 (a) means defining a long tunnel;
 (b) a plunger having an internal passage and being constructed and arranged for reciprocating movement in said tunnel, the plunger moving through first, second and third axial positions;
 (c) means dividing the space between the plunger and tunnel into an axial series of separate annular zones;
 (d) first rough pumping means and means defining a pumping port connected thereto;
 (e) at least a second rough pumping means and means defining a pumping port connected thereto;
 (f) fine vacuum pumping means for producing the high vacuum level necessary for effective operation of a mass spectrometer or the like or for the conduct of helium leak detection processes or the like and means defining a pumping port connected thereto;
 (g) means defining an inlet port for connection to a leak test sample or the like;
 the said means (a)–(g) being constructed and arranged so that in said first axial position of the plunger (b), the inlet port (g) is placed in communication with the first rough pump port (d) via the internal passage of the plunger and at least one of said annular zones; so that in said second axial position of the plunger, the inlet port (g) is placed in communication with the second rough pump port (e) via the internal passage of the plunger and at least one of said annular zones; so that in said third position of the plunger, the inlet port (g) is placed in communication with the high vacuum port (f) via the internal passage of the plunger and at least one of said annular zones, said plunger internal passage therein and annular zones being constructed and arranged so that the separation of said zones is maintained throughout the movement of said plunger through said first, second and third positions.

2. The apparatus of claim 1 wherein the first, second and third axial positions are in the order of first, second and third, respectively as the plunger is moved continuously in one direction.

3. The apparatus of claim 1 wherein the inlet port (g) is located in the tunnel defining means (a) to provide a stationary test port.

4. The apparatus of claim 3 wherein all of said ports are in the tunnel wall and wherein the plunger has two ends of the internal passage in its side wall, the distance between the ends of the passage being sufficiently long to straddle pairs of gaskets which straddle the said ports (d) and (e) of the first and second rough pumping means and wherein the ports (d) and (e) straddle the port (g).

5. The apparatus of claim 1 in combination with a mass analyzer mass spectrometer instrument connected to the high vacuum pumping means (f) to analyze gas moving from the inlet port to the high vacuum pumping means when the valve plunger is in its third axial position.

6. A multi-valve apparatus according to claim 1 with at least a pair of tunnels (a) containing a pair of plungers (b) therein, the multiple valves having common means (d), (e), (f).

7. The apparatus of claim 1 comprising (h) an air release port connected to the tunnel, the said means (a)–(h) being constructed and arranged so that a fourth axial position of the valve places the inlet port (g) in communication with the air release port (h) via the internal passage of the plunger (b).

8. An improved vacuum apparatus for rapid cycle, sequential mass spectrometer leak testing operations, and like operations conducted at high speed and fine vacuum levels such as those sufficient to be compatible with mass spectrometer operation, the apparatus comprising, in combination:
 (a) means defining an elongated tunnel,
 (b) means defining a long plunger having an internal passage and constructed and arranged for reciprocating movement within said tunnel;
 (c) gasket means distributed along the length of the tunnel and surrounding the plunger to define axially separate zones along the length of the tunnel between the tunnel and plunger;
 (d) first rough pumping means and means defining a pumping port connected thereto;
 (e) at least a second rough pumping means and means defining a pumping port connected thereto;
 (f) high vacuum pumping means and means defining a pumping port connected thereto;
 (g) means defining an inlet port for connection to a leak test sample or the like; and
 (h) air release means for releasing said inlet port to atmospheric pressure,
 the said means (a)–(g) being constructed and arranged so that a first axial position of the plunger (b) places the inlet port (g) in communication with the port (d) via the internal passage of the plunger; so that a second axial position of the plunger places the inlet port (g) in communication with the port (e) via the internal passage of the plunger; and so that a third axial position of the plunger places the inlet port (g) in communication with the port (f) via the internal passage of the plunger, and
 wherein a relatively restricted annulus is provided in one of the said axial zones between the tunnel and the plunger, the said restricted annulus forming part of the passage between the inlet port (g) and the port (f) in the third axial position of the plunger.

9. In combination, a leak detector mass spectrometer instrument connected to a sample inlet port via an inlet accessory valve, the combination further comprising first and at least second rough pumping means and air release means connected to the inlet accessory valve and the combination further comprising fine vacuum pumping means conected to the leak detector instrument, the said inlet accessory valve comprising:
  (a) means defining an elongated tunnel;
  (b) means defining a long spool-form plunger, the plunger having an internal passage, the said plunger being mounted in the tunnel for reciprocating movement;
  (c) annular gaskets distributed along the length of the tunnel and surrounding the plunger to define axially separate annular zones along the length of the tunnel in a sequence as follows:
    a first rough pumping zone
    an inlet zone
    a second rough pumping zone
    a fine vacuum zone;
  (d) means defining a first port on the tunnel located at said first rough pumping zone;
  (e) means defining a second port on the tunnel located at said second rough pumping zone;
  (f) means defining an inlet port at said tunnel, between said first and second ports, located at said inlet zone and means for connecting a leak test sample to said inlet port;
  (g) means defining an exit port connected to said fine vacuum zone to the said instrument and high vacuum pumping means;

the said plunger, tunnel and gaskets being constructed and arranged so that in a first position of the plunger the internal passage thereof places the first port in communication with the inlet port; so that in a second position of the plunger the internal passage thereof places the second port in communication with the inlet port; and so that, in a third position of the plunger, the internal passage thereof places the exit port in communication with the inlet port via the fine vacuum zone, whereby rapid cycle, sequential leak testing may be accomplished, with the additional advantages of good protection of the instrument from inrushing atmospheric air and screening out of background signal due to atmospheric content of trace gas.

References Cited

UNITED STATES PATENTS

| | | | |
|---|---|---|---|
| 2,590,333 | 3/1952 | Lockheed et al. | 137—625.11 XR |
| 2,973,183 | 2/1961 | Alger | 251—368 XR |
| 3,126,734 | 3/1964 | Stutzman | 73—40.7 XR |
| 3,162,210 | 12/1964 | Bemis | 137—625.11 XR |

LOUIS R. PRINCE, *Primary Examiner.*

DAVID SCHONBERG, *Examiner.*

J. NOLTON, *Assistant Examiner.*